US00RE35108E

United States Patent [19]

Hagen et al.

[11] E Patent Number: Re. 35,108

[45] Reissued Date of Patent: Dec. 5, 1995

[54] METHOD FOR SPINNING MULTIPLE COLORED YARN

[75] Inventors: Gerry A. Hagen, Anderson, S.C.; Dominick A. Burlone; Phillip E. Wilson, both of Asheville, N.C.

[73] Assignee: BASF Corporation, Parsippany, N.J.

[21] Appl. No.: 224,900

[22] Filed: Apr. 8, 1994

Related U.S. Patent Documents

Reissue of:

[64] Patent No.: 5,234,650
Issued: Aug. 10, 1993
Appl. No.: 860,665
Filed: Mar. 30, 1992

[51] Int. Cl.[6] ..... D01D 4/06

[52] U.S. Cl. ..... 264/176.1; 264/103; 264/210.8; 264/211.14; 264/245; 425/131.5; 425/198; 425/463; 425/464

[58] Field of Search ..... 264/176.1, 103, 264/75, 210.8, 78, 211.14, 245; 425/131.5, 198–199, 464, 463, 462, 382.2

[56] References Cited

U.S. PATENT DOCUMENTS

| | | | |
|---|---|---|---|
| 1,975,153 | 10/1934 | Jacquet | 264/103 |
| 2,386,173 | 10/1945 | Kulp | 425/463 |
| 2,428,046 | 9/1947 | Sisson et al. | 264/171 |
| 3,289,249 | 12/1966 | Nakayama et al. | 264/171 |
| 3,344,472 | 10/1967 | Kitajima et al. | 425/131.5 |
| 3,375,548 | 4/1968 | Kido et al. | 425/382.2 |
| 3,457,341 | 7/1969 | Duncan et al. . | |
| 3,492,692 | 2/1970 | Soda et al. | 425/464 |
| 3,500,498 | 3/1970 | Fukuma et al. | 18/8 |
| 3,531,368 | 9/1970 | Okamoto et al. | 161/175 |
| 3,584,339 | 6/1971 | Kamachi et al. | 425/198 |
| 3,681,910 | 8/1972 | Reese . | |
| 3,718,534 | 2/1973 | Okamoto et al. | 161/173 |
| 3,730,662 | 5/1973 | Nunning . | |
| 3,761,552 | 9/1973 | Chill et al. | 264/103 |
| 3,899,562 | 8/1975 | Seidl | 264/210 |
| 3,992,499 | 11/1976 | Lee | 264/78 |
| 4,025,595 | 5/1977 | Mirhej | 264/103 |
| 4,370,114 | 1/1983 | Okamoto et al. | 425/131.5 |
| 4,445,833 | 5/1984 | Moriki et al. | 425/131.5 |
| 4,875,844 | 10/1989 | Nakajima et al. | 425/131.5 |
| 4,933,427 | 6/1990 | Charles et al. | 264/177.13 |
| 5,162,074 | 11/1992 | Hills | 425/131.5 |
| 5,244,614 | 9/1993 | Hagen | 425/131.5 |
| 5,256,050 | 10/1993 | Davies | 425/131.5 |
| 5,344,297 | 9/1994 | Hills | 425/131.5 |

FOREIGN PATENT DOCUMENTS

| | | | |
|---|---|---|---|
| 0227020 | 7/1987 | European Pat. Off. | 425/463 |
| 0350450 | 1/1990 | European Pat. Off. . | |
| 0434601 | 6/1991 | European Pat. Off. . | |
| 41-17923 | 10/1966 | Japan . | |
| 57-047941 | 3/1982 | Japan . | |
| 61-00605 | 1/1986 | Japan | 425/463 |
| 3-27107 | 2/1991 | Japan | 425/462 |
| WO89/02938 | 9/1988 | WIPO . | |

*Primary Examiner*—Jeffery R. Thurlow
*Attorney, Agent, or Firm*—Karen M. Dellerman

[57] ABSTRACT

A spin pack for spinning multiple components includes a distribution device which distributes mutually separated molten polymer streams to a spinneret so that each mutually separated molten polymer stream is accessible at each active spinneret backhole. Intermediate the spinneret and the distribution device, a selection assembly selects which, if any, mutually separated molten polymer stream flows into which backhole.

3 Claims, 20 Drawing Sheets

METHOD FOR SPINNING MULTIPLE COLORED YARN

Matter enclosed in heavy brackets [ ] appears in the original patent but forms no part of this reissue specification; matter printed in italics indicates the additions made by reissue.

FIELD OF THE INVENTION

This invention relates generally to melt extrusion of fiber-forming polymers. More specifically, this invention relates to melt extrusion to form multicomponent yarn.

BACKGROUND OF THE INVENTION

Spin packs for extruding component fibers are known. Such spin packs are of two general types: those which spin multicomponent filaments (more than one component within a single filament); and those which spin mixed filament yarn (more than one type of filament within a yarn). In this application, the term "multicomponent yarn" refers to both of these general types as well as combinations of the two. The term "active backhole" denotes backholes for spinneret orifices that are, or will be, actively extruding filameters.

Exemplary of spin packs for mixed filament yarn in U.S. Pat. No. 3,457,341 to Duncan et al., which discloses spinning mixed filament yarn by extruding two different polymer components through two different sized orifices of the same spinneret. This is done to control differential spinning characteristics of the individual polymers within established levels of operability.

Exemplary of spin packs for multicomponent filaments is U.S. Pat. No. 3,730,662 to Nunning. Nunning discloses a spin pack for spinning side-by-side or sheath/core filaments by distributing mutually separated polymer streams to each spinneret backhole. Each discrete stream enters each active backhole.

Known are spinnerets useful for spinning both multicomponent and "ordinary" (single-component) filaments by simple rotation of a distribution plate. Such a device is disclosed in U.S. Pat. No. 3,584,339 to Kamachi et al.

Also, known is an apparatus for preparing profiled multicomponent fibers from mutually separated polymer streams. Such an apparatus is described in commonly assigned PCT Application No. WO 89/02938. In that apparatus, mutually separated polymer streams are routed in a predetermined fashion to the backhole of each spinneret orifice.

Yet, all of the known spin packs are designed for spinning one or two predetermined and fixed multicomponent or mixed filaments. Especially valuable would be a spin pack which routes multiple mutually separated polymer streams to the proximity of the spinneret backhole and allows variable selection at the backhole of the polymer stream which issues through the spinneret orifice.

Such a spin pack would be useful in preparing uniformly spread components in mixed filament yarn, inter alia. U.S. Pat. No. 3,681,910 to Reese teaches a composite yarn of two discrete classes having a high degree of filament mixing. Yet, high filament mixing (or distribution) in yarns composed of more than two discrete classes is unknown in the art.

Also useful would be a yarn in which a high degree of filament mixing is present in one area of the yarn and components in other areas of the yarn, one or more filament types are concentrated. Such an arrangement of mixed and non-mixed areas result in a heather yarn with a pleasing color highlight effect. Such a yarn is also not known.

SUMMARY OF THE INVENTION

To meet the needs described above, a first embodiment of the present invention provides a spin pack for spinning multiple components. The spin pack includes means for receiving at least two mutually separated molten polymer streams; a spinneret having a backhole and least one active fiber extrusion orifice; upstream of the spinneret, a distribution device in fluid flow communication with the receiving means and having means for distributing the mutually separated molten polymer streams to the spinneret wherein each mutually separated molten polymer stream is accessible at each backhole; and intermediate the spinneret and the distribution device, a selection assembly having means for selecting which, if any, mutually separated molten polymer stream flows into which backhole.

Another embodiment of the present invention concerns a process for spinning multiple components by (a) feeding mutually separated molten polymer components to a spin pack having a spinneret with extrusion orifices for issuing filaments, each extrusion orifice having a backhole for receiving molten polymer; (b) distributing each mutually separated component so that each component is accessible as a distinct component at every active spinneret backhole; (c) selecting which component accessible at each backhole, if any, is issued as a filament from the extrusion orifice; and (d) extruding multiple component filaments.

A further embodiment of the present invention concerns a mixed filament yarn having the appearance of high color homogeneity and characterized by filaments of at least three different colors dispersed approximately uniformly through said yarn.

A still further embodiment of the present invention is a multi-component yarn having two or more differentiated zones of filament mixing.

It is an object of the present invention to provide an improved spin pack design.

It is another object of the present invention to provide an improved process for melt spinning multicomponent filaments or mixed filament yarns.

A further object of the present invention is to provide an improved mixed filament yarn.

After reading the following description, related objects and advantages of the present invention will be apparent to those ordinarily skilled in the art to which the invention pertains.

DETAILED DESCRIPTION OF THE PREFERRED EMBODIMENTS

Figure 1:
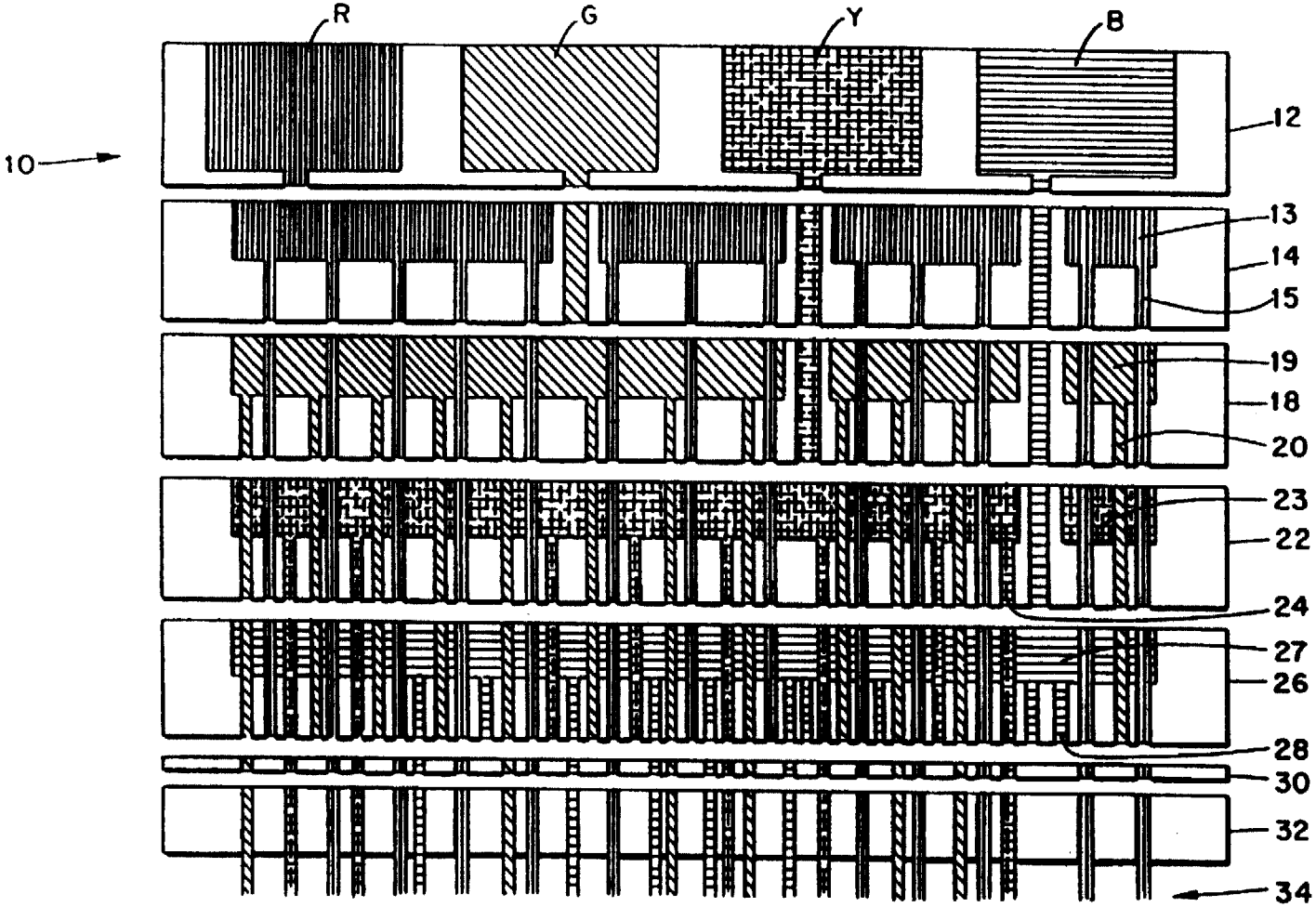
FIGS. 1–9 schematically represent a first embodiment of a spin pack according to the present invention.

To promote an understanding of the principles of the present invention, descriptions of specific embodiments of the invention follow and specific language describes the same. It will nevertheless be understood that no limitation of the scope of the invention is thereby intended, and that such alterations and further modifications, and such further applications of the principles of the invention as discussed are contemplated as would normally occur to one ordinarily skilled in the art to which the invention pertains.

As used in the following description of the drawings, unless noted otherwise, the terms "vertical" and "horizontal" refer to the orientation of the drawing on the page and not to the orientation of the apparatus in three dimensional space.

In general, the present invention relates to an apparatus and method for routing mutually separated polymer streams to each backhole of a spinneret such that each polymer stream is accessible to each backhole. At the backhole, the streams permitted to enter the backhole are versatilely programmed. This principle of the present invention applies to at least two, preferably four, and possibly more different polymer streams.

As a result of the accessibility of each component at each backhole, this invention provides economic and process advantages. The invention is economically advantageous since product changes are facilitated by simply exchanging a single plate in a spin pack. Process advantages are facilitated from the reduced part inventory permitted by the flexibility of this invention.

The first embodiment of the present invention is a spin pack for spinning multicomponent yarn where at least two, preferably four, and possibly more, different polymer component streams are each fed mutually separated to the backhole of a spinneret orifice to form at each backhole, a cluster of feedstreams. Members from each cluster are then selected for extrusion. This embodiment is based on a "pool and down" method of distribution. Individual feed streams form pools which separate into a plurality of streams of that polymer, which then pass down, mutually separated from the other types of polymer, to be accessible at the spinneret backhole.

FIGS. 1–9 schematically represent a spin pack according to the first embodiment. This embodiment is relatively uncomplicated and is presented first to assist in understanding this invention.

FIG. 1 is a schematic cross-section illustrating polymer flow through spin pack 10. To illustrate the invention, four polymer feeds of four different colors are shown. Each color is fed to filter plate 12. Colors illustrated are blue (B), yellow (Y), green (G), and red (R). Each color is kept mutually separate from filter plate 12 to spinneret 32.

Polymer (R) flows from filter plate 12 to pool plate 14, where it forms pool 13 for making a larger number of smaller red polymer streams. Thirteen red streams 15 are shown. Pool 13 does not intersect the other polymer feed flows, which pass completely through to pool plate 18. In pool plate 18, polymer (G) forms pool 19 to form twelve smaller green polymer streams 21. Each polymer stream (R) passes through pool plate 18 intact and feed streams (Y) and (B) pass through to pool plate 22, where polymer (Y) forms pool 23 and eight smaller yellow polymer streams 24. All streams remain mutually separated at this plate and pass through, without mixing, to pool plate 26. At pool plate 26, the final feed stream—polymer (B)—forms pool 27 and ten smaller blue polymer streams 28. Now each color has been distributed to form numerous separated polymer feed steams. Each feed stream is now accessible to each backhole of spinneret 32. The manner in which each steam is accessible will be more readily understood from FIGS. 2–8 which show, in plan view, the component parts of spin pack 10.

Program plate 30, however, allows only pre-selected polymer streams to pass through to spinneret 32. In this manner, a pre-selected number and arrangement of fibers 34 are extruded to form yarn. As shown, a mixed filament yarn is prepared having six green filaments, five yellow filaments, ten red filaments, and five blue filaments.

Figure 2:
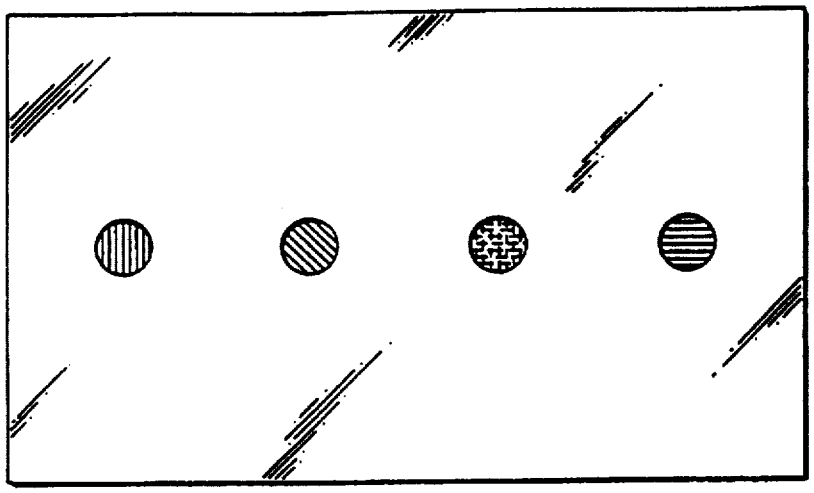
Figure 3:
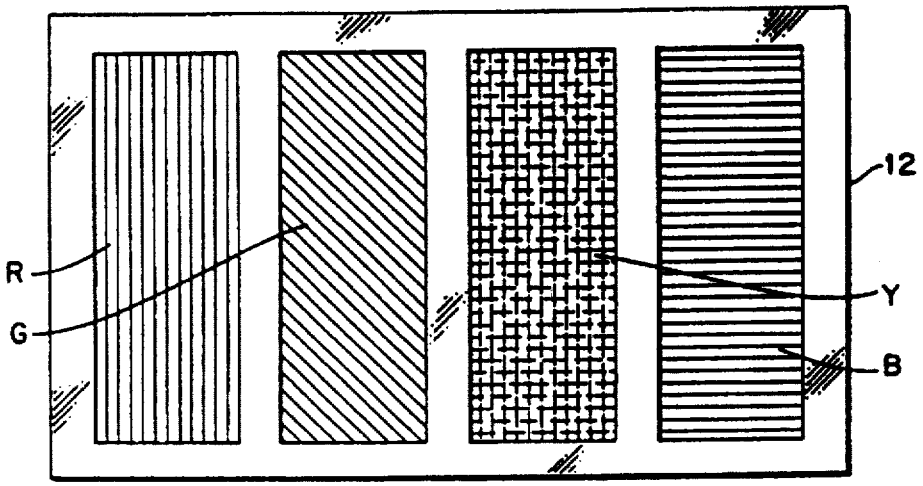
Figure 7:
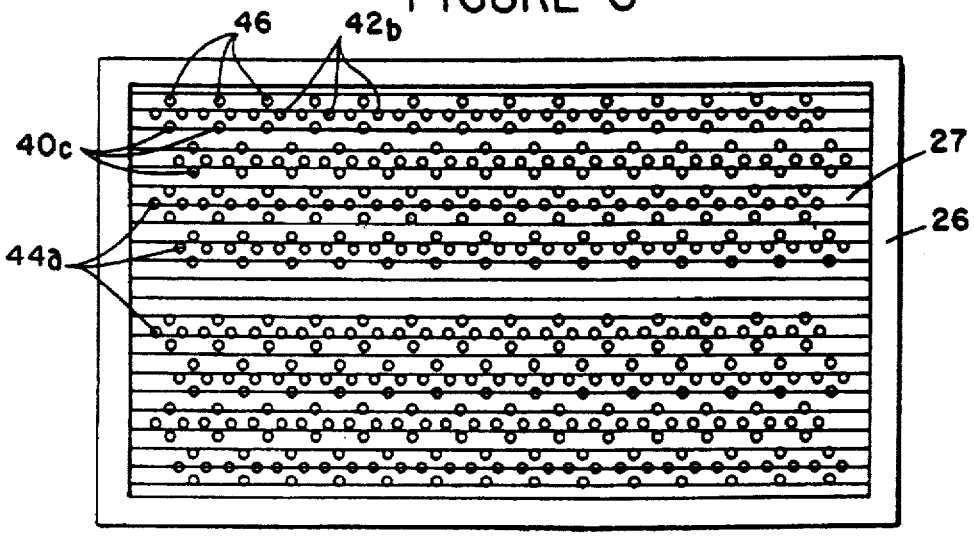
Figure 8:
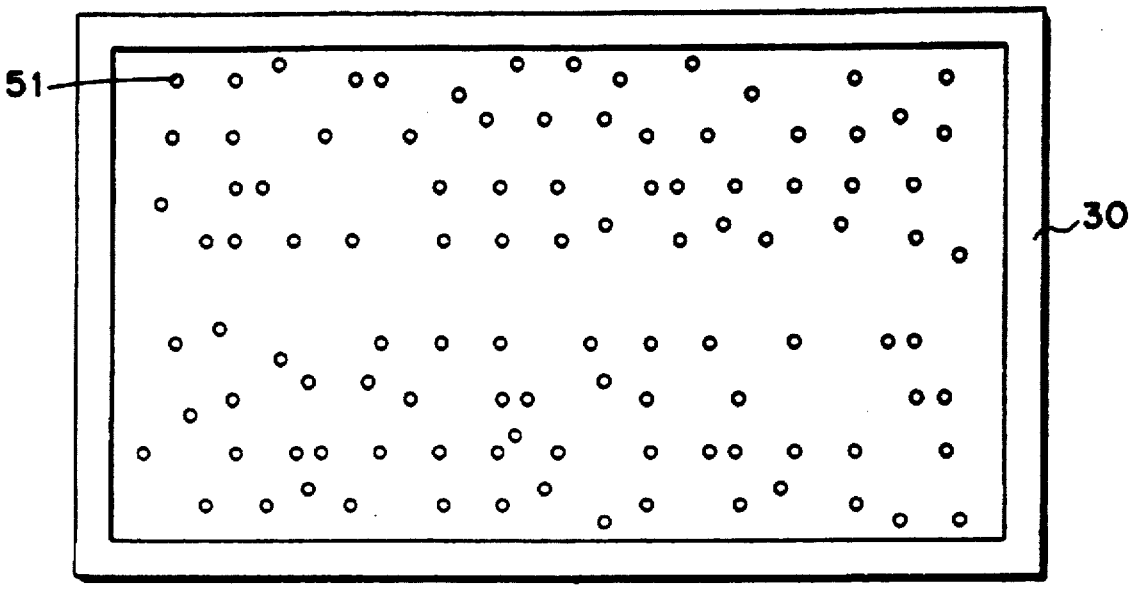
Figure 9:
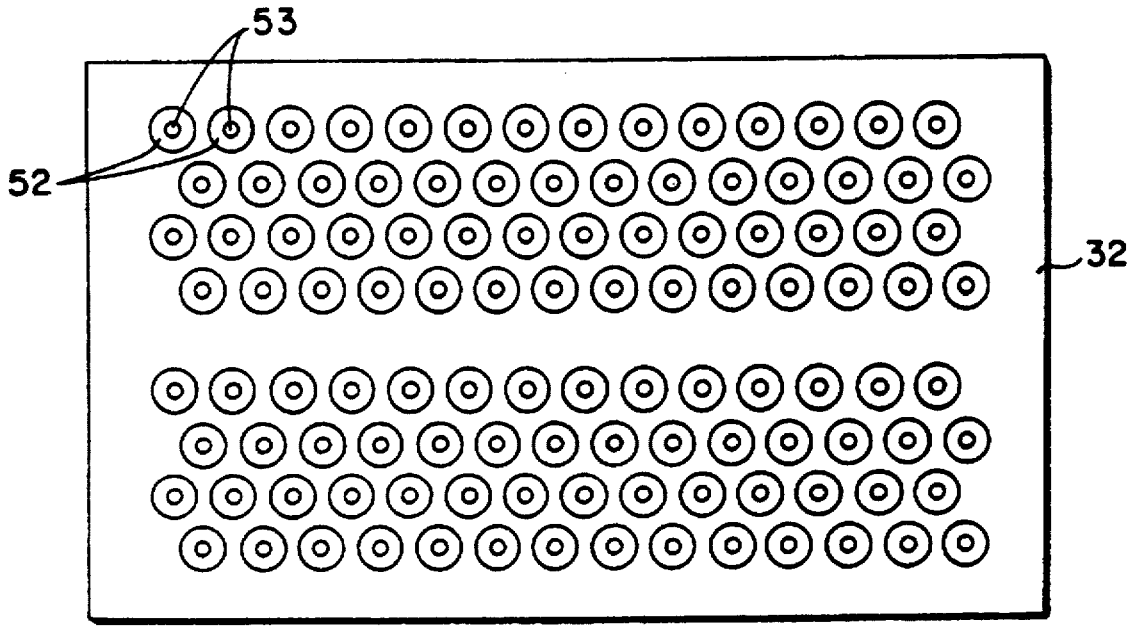

FIGS. 2–9 are top plan views of spin pack components of a first alternate configuration of the first embodiment of the present invention. The spin pack comprises a series of stacked plates, each plate specialized for a particular function. There are four primary functions—filtering, pooling, programming, and extruding. The plates are shown such that FIG. 3 is the uppermost (or first) plate and FIG. 9 is the lowest (or last) plate.

FIG. 2 shows beam porting of red, green, yellow, and blue polymer to filter plate 12 shown in FIG. 3.

FIG. 3 is a top plan view of filter plate 12 showing the orientation of polymer streams (R), (G), (Y), and (B).

Figure 4:
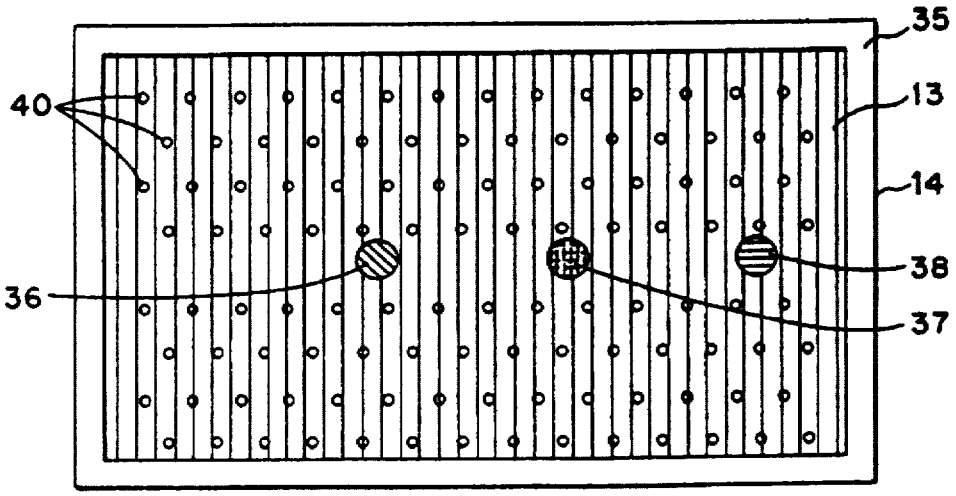

FIG. 4 is a top plan view of pool plate 14 showing red polymer pool 13. The pool is formed by feeding red polymer from filter plate 12 into a reservoir formed by raised edge 35. All of the pool plates are formed as reservoirs defined by a raised edge. Ports for green, yellow, and blue polymers are shown as 36, 37, and 38, respectively. Holes 40 split red polymer into multiple mutually separated red polymer streams.

Figure 5:
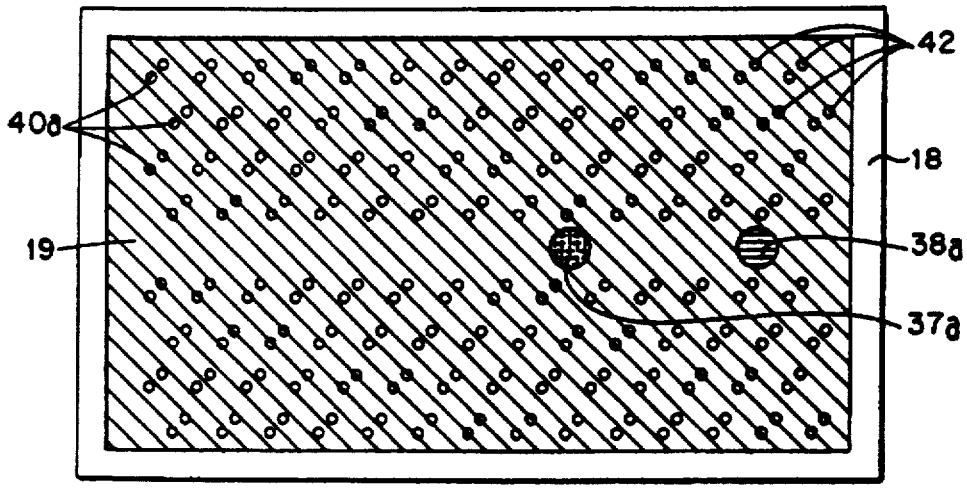

FIG. 5 is a top plan view of pool plate 18 showing green polymer pool 19, and ports for yellow and blue polymers are shown as 37a and 38a, respectively. Ports 37a and 38a communicate with ports 37 and 38 in pool plate 14 to pass yellow and blue polymer down through pool plate 18 intact. Holes 40a sealingly communicate with holes 40 in pool plate 14 to pass red polymer through intact as multiple red polymer streams. Holes 42 separate green polymer into many individual green polymer streams.

Figure 6:
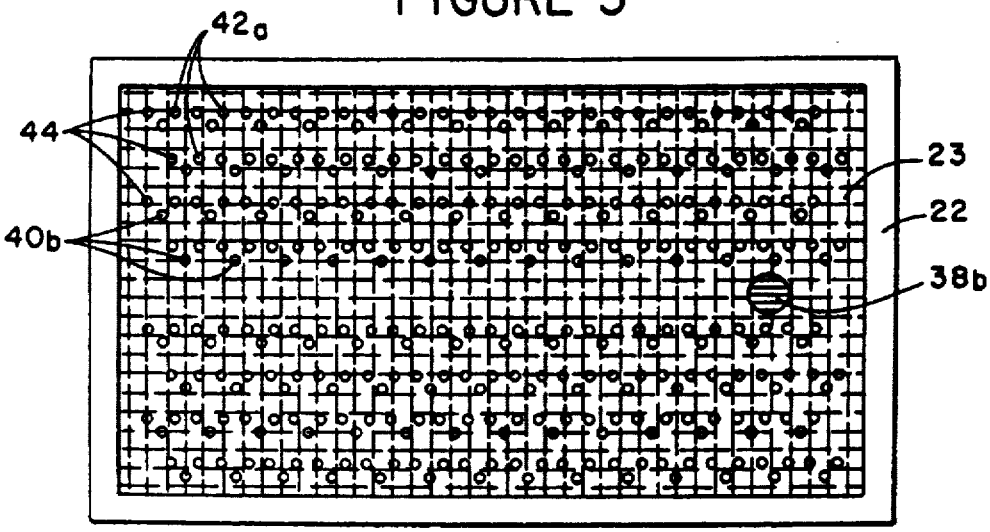

Pool plate 22 is shown in top plan view in FIG. 6 illustrating yellow polymer pool 23. Holes 44 form multiple yellow polymer streams. Port 38b communicates with port 38a to pass blue polymer feed streams (B) intact through this plate. Holes 40b sealingly communicate with holes 40a in pool plate 18 to pass red polymer (R) through intact. Holes 42a sealingly communicate with holes 42 in pool plate 18 to pass green polymer streams through intact.

FIG. 7 illustrates pool plate 26 which receives blue polymer from port 38b and forms blue polymer pool 27. Holes 46 form multiple blue polymer streams. Holes 40c pass red polymer as multiple individual red polymer streams; holes 42b pass green polymer as multiple individual green polymer streams; and holes 44a pass yellow polymer as multiple yellow polymer streams. On plate 26, holes 46, 44a, 42b and 40c form clusters 50 of four holes. One cluster 50 is indicated with a broken lined square. Each cluster 50 has one hole corresponding to each separate polymer component fed to the spin pack. There is at least one cluster 50 for each active extrusion orifice. Clusters 50 function to make each polymer feed accessible to each spinneret backhole.

FIG. 8 is a top plan view of program plate 30. Program plate 30 panes only pre-selected polymer streams from each cluster to spinneret 32 (top plan view in FIG. 9) to prepare a mixed filament yarn. Program holes 51 sealingly align with only a single mutually separated polymer stream of clusters 50. Therefore, only a single polymer stream goes to the backhole. It should be readily recognized that, by providing more than one program hole per cluster, more than one polymer stream will enter the backhole. The color chosen for extrusion may be varied by exchanging program plate 30 for another program plate having a different arrangement of holes. In addition, program plate 30 may act as a metering plate.

FIG. 9 is a top plan view of spinneret 32 showing backholes 52 and extrusion orifices 53. Any known spinneret may be used.

FIGS. 10–16 illustrate a first alternate configuration of the second embodiment of the spin pack of the present invention. This configuration operates on a linear distribution principle. The spin pack shown in these figures is designed to spin four-component trilobal fibers. Other fiber configurations are possible by simply substituting the program plate as discussed further below. The figures show plates which, when assembled, stack sealingly to form a spin pack according to the present invention. Most of the plates are shown in top plan view. The following discussion starts with the first plate in the pack and proceeds to the final plate, the spinneret.

Figure 10:
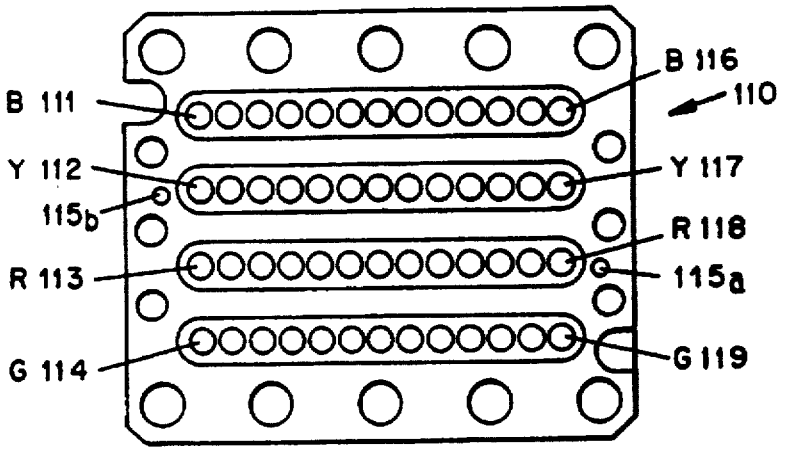
FIGS. 10–16 illustrate a first alternate configuration of the second embodiment of a spin pack according to the present invention.

FIG. 10 shows filter plate 110 designed to receive four different polymer components into horizontal filter grooves 111, 112, 113, and 114. In each horizontal filter groove, there are multiple filter holes 116, 117, 118, and 119, respectively, which horizontally distribute the flow of polymer (B, Y, R, G, respectively) directed to the filter groove. Also, there are alignment holes used to align each plate with its nearest neighbors. For example, alignment holes 115 and 115b of filter plate 110 align with alignment holes 125a and 125b of first distribution plate 120 (FIG. 11).

Figure 11:
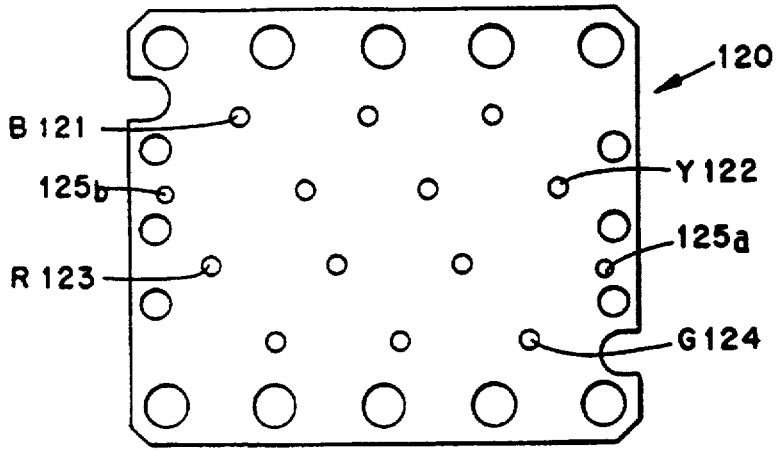

FIG. 11 is a top plan view of the top surface of first distribution plate 120, the next descending plate in the pack. This surface sealingly contacts the lower surface (not shown) of filter plate 110 (FIG. 10). Through holes corresponding to each mutually separated polymer feed form rows. The holes in the rows are staggered so that there is only one hole per column. Polymer B from filter groove 111 flows from filter hole 116 to through holes 121. Polymer Y from filter groove 112 flows from filter hole 117 to through holes 122. Polymer from filter groove 113 flows from filter hole 118 to through holes 123. Polymer from filter groove 114 flows from filter hole 119 to through holes 124.

Figure 12:
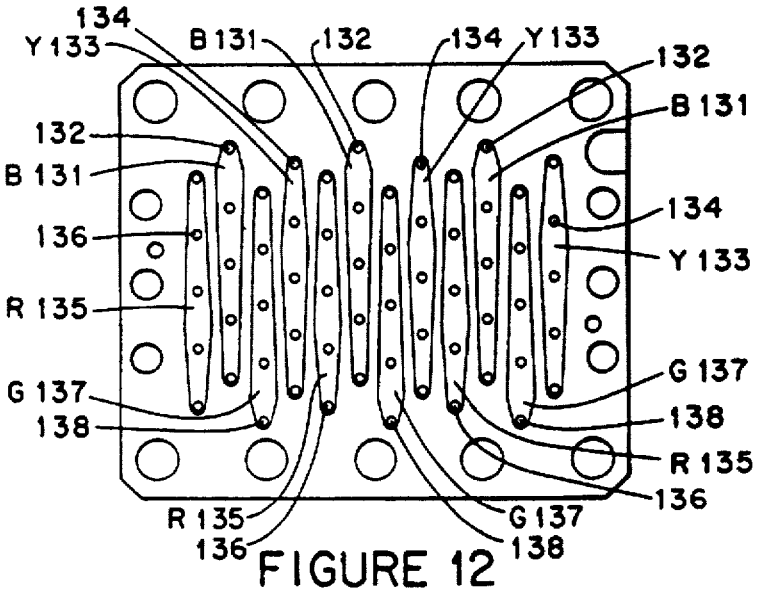

FIG. 12 is a top plan view of second distribution plate 130, the next descending plate in the pack. Second distribution plate 130 is provided with twelve vertical distribution grooves for receiving polymer from upper plate 120 as separate polymer streams. In the example used, blue polymer (b) is received from holes 121 into vertical distribution grooves 131. As shown, three vertical distribution grooves 131 are provided for blue polymer. Each groove 131 is provided with through holes 132 to further distribute blue polymer (B) below. Vertical distribution grooves 133 receive yellow polymer (Y) from through holes 122 in upper plate 120. Three vertical distribution grooves 133 are so provided for yellow polymer. In vertical distribution grooves 133, through holes 134 are present to distribute yellow polymer (Y) below. Vertical distribution grooves 135 receive red (R) polymer from through holes 123 in upper plate 120. Three vertical distribution grooves 138 contain through holes 136 to receive red polymer. Finally, vertical distribution grooves 137 receive green (G) polymer from through holes 124 in upper plate 120. Three vertical distribution grooves 137 are provided with through holes 138 which distribute green polymer to the remaining plates below.

Figure 13:
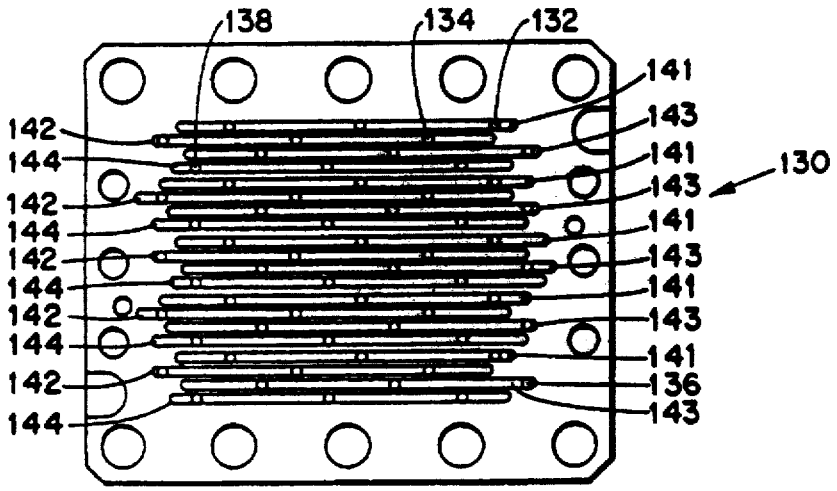

FIG. 13 is a bottom plan view of plate 130 showing twenty horizontal distribution grooves representing five rows of each color polymer. Since the bottom face of plate 130 sealingly contacts the top face of the next adjacent plate, the horizontal distribution grooves form closed flow paths bounded by the next adjacent plate. Polymer may only flow where downstream holes are provided. This is true of all the stacked plates of the invention. Blue (B) polymer passes from through holes 132 (FIG. 12) into horizontal distribution grooves 141. Yellow (Y) polymer passes from through holes 134 (FIG. 12) into horizontal distribution grooves 142. Horizontal distribution grooves 143 receive red polymer from through holes 136 (FIG. 12). Finally, green polymer is received from through holes 138 (FIG. 12) into horizontal grooves 144.

Figure 14:
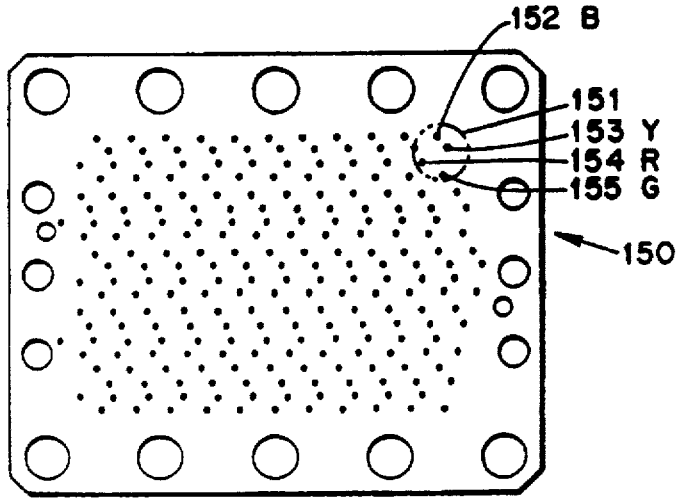

FIG. 14 shows top plan view of metering plate 150 showing a representative hole cluster 151 encircled with a dotted line. As shown, hole cluster 151 includes one metering hole for each color polymer. Metering hole 152 in the cluster meters blue polymer from horizontal distribution groove 141 in distribution plate 130 (FIG. 13). Metering hole 153 meters yellow polymer from horizontal distribution groove 142 in distribution plate 130 (FIG. 13). Metering hole 154 meters red polymer from horizontal distribution groove 143 in plate 130 (FIG. 13). Metering hole 155 meters green polymer from horizontal distribution groove 144 in distribution plate 130 (FIG. 13). Each color is, therefore, accessible to each spinneret backhole.

Figure 15A:
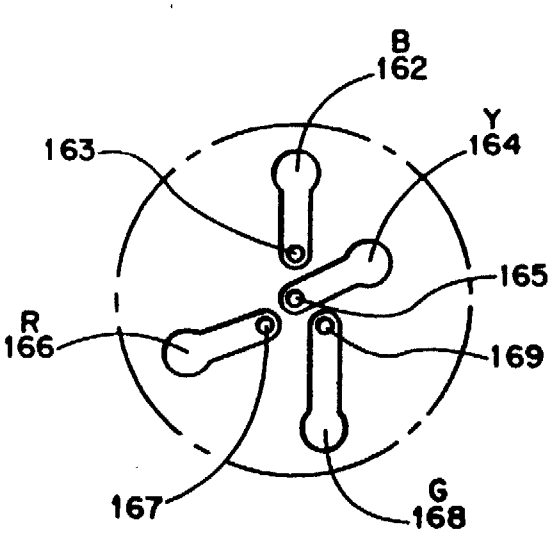
Figure 15:
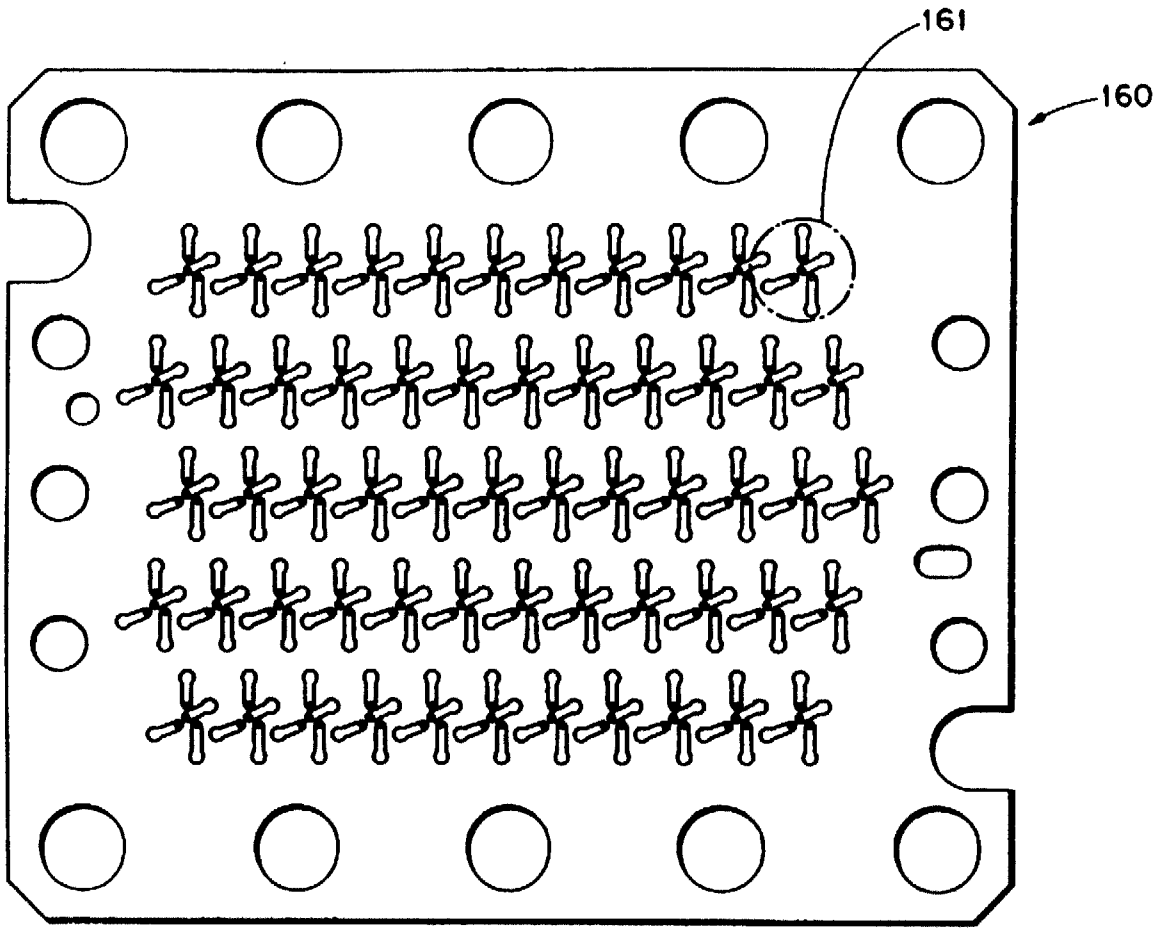

FIG. 15 is a top plan view of program plate 160 showing slot and program hole clusters 161. An enlarged view of a representative cluster 16 is shown in FIG. 15A. It should be recognized that program plate 160 can have various other arrangements to provide or close off access to the spinneret for one or more colors (discrete polymer streams) presented by each metering hole cluster 151. By simply replacing program plate 160, various different multicomponent yarns may be selectively extruded from the spin pack.

Figure 16:
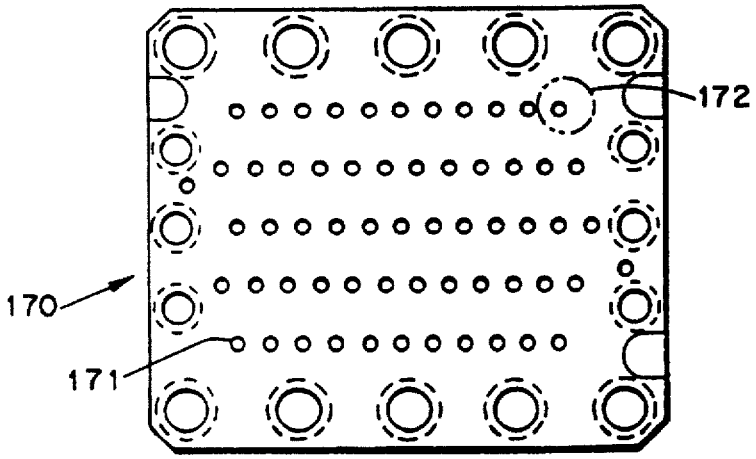

FIGS. 15 and 15A, however, depict an exemplary program plate which shows one program hole for every color so that every color enters the spinneret backhole. The program holes in any one cluster each communicate with the same spinneret backhole. Slot 162 receives blue polymer from metering hole 152 and directs it transversely to program hole 163 which provides flow to the backhole of the spinneret (FIG. 16). Similarly, slot 164 picks up yellow polymer from metering hole 153 and directs it transversely to program hole 165 which provides flow to the backhole of the spinneret. Likewise, slot 166 receives red polymer from metering hole 154 and directs it transversely to program hole 167 which provides flow to the backhole of the spinneret. Finally, slot 168 picks up green polymer from metering hole 155 and directs it transversely to program hole 169 which provides flow to the backhole of the spinneret.

FIG. 16 is the final plate in the pack and sealingly adjoins the bottom surface (not shown) of final plate 160. FIG. 16 is a top plan view of spinneret plate 170 showing backholes 171 to the spinning orifices. The backhole corresponding to the illustrated cluster 161 in FIG. 15 is shown with dotted line circle 172. In the design described by FIGS. 10-16, each color will enter each backhole. Four color (or four component) multicomponent filaments are formed. The spinneret orifice may be of any design (shape) known or developed in the art.

Figure 17:
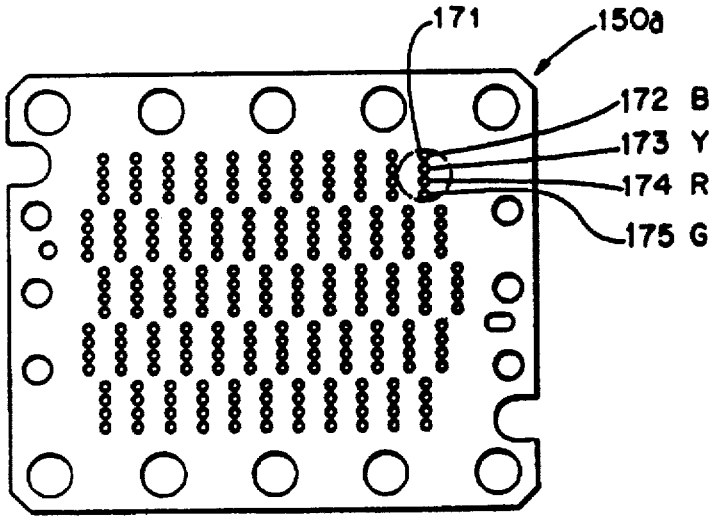
FIGS. 17–19 illustrate a second alternate configuration of the second embodiment of the spin pack of the present invention.
Figure 18:
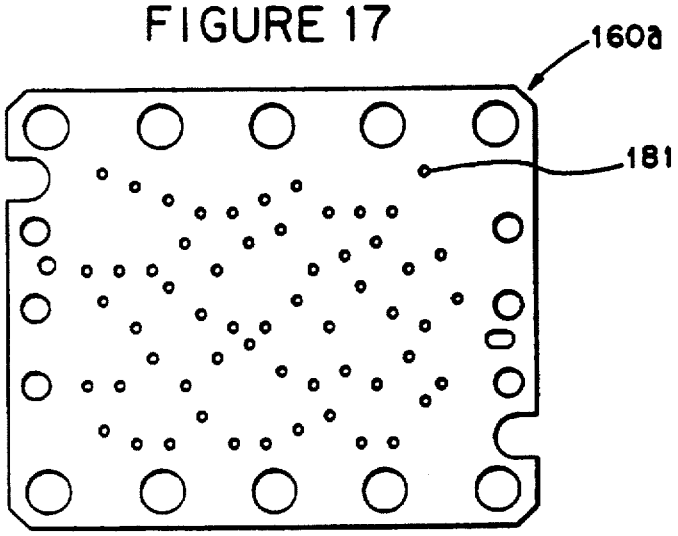
Figure 19:
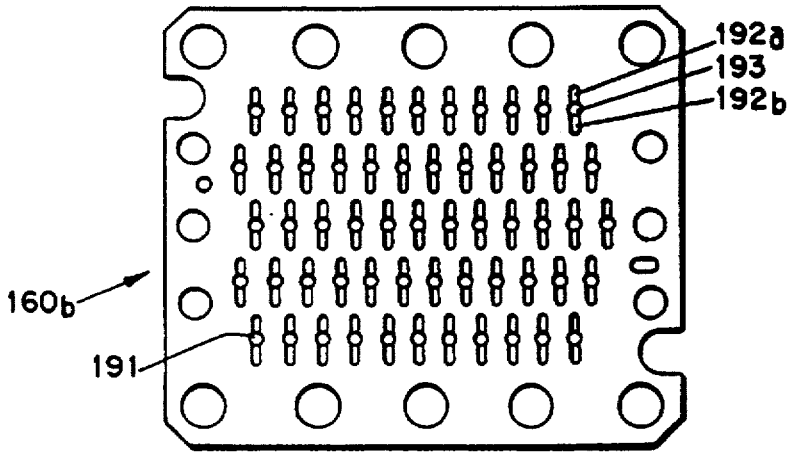

FIGS. 17–19 illustrate an optional configuration in the spin pack of FIGS. 10–16. More particularly, the three plates illustrated by FIGS. 17–19 may be substituted for plates 160 and 160 shown in FIGS. 14 and 15, respectively. The use of plates shown in FIGS. 17–19 results in a mixed filament yarn, although multicomponent filaments are also possible. For ease in understanding, plates are numbered 150a, 160a, and 160b to emphasize their corresponding functions to the plates numbered 150 and 160.

FIG. 17 is a top plan view of metering plate

Metering plate 150a has clusters 171 shown encircled by 150a. a dotted line. These clusters are composed of four metering holes 172, 173, 174, and 175, respectively. These metering holes are aligned to meter polymer from horizontal distribution grooves 141, 142, 143, and 144, respectively, corresponding to polymers blue, yellow, red, and green, also respectively.

FIG. 18 is a top plan view of program plate 160a, which is provided with program holes, one program hole for each cluster 171 (FIG. 17). Therefore, while each polymer color is available at program plate 160a, the presence of only one program hole per cluster 171 makes three of the metering holes blind at the top surface of program plate 160a. For example, the sample cluster 171 corresponds to program hole 181 and allows only yellow polymer to pass through.

FIG. 19 is a top plan view of capillary plate 160b. Capillary plate 160b includes capillary holes 191, one capillary hole 191 corresponds to each cluster 171. Capillary holes 191 are designed to receive polymer flow from program plate 181, regardless of which color has been selected by the program plate. The keyhole shaped configuration capillary hole 191 with wings 192a and 192b and central capillary 193 permits this function. The wings of capillary hole 191 fits a wing 192a will receive blue or yellow polymer streams and direct the streams to capillary hole 193. Wing 192b is designed to receive red or green polymer flow.

The plates shown in FIGS. 17–19 allow for easy interchangeability of plates for various colors (or components) to be versatilely spun from a single spinneret. Simple replacement of program plate 160a allows the number of filaments of a single color to be quickly and easily altered. In addition, the plates shown in FIGS. 17–19 provide improved fluid dynamics over the plates shown in FIGS. 14 and 15.

As noted, versatility is an advantage of the present invention. Versatility is important for doing experimentation and product development for color matching, color mixing, and color effects (like heather yarns). The present invention also lends itself to use with existing product lines that are prepared regularly on a production basis. Thus, different products from the same polymer feed streams are possible, which differ only in filament to filament ratios. For example, a 112 filament product having 56 red and 56 green filaments may be spun from a feed stream used previously to make a 112 filament product having 28 red, 28 yellow, and 56 green filaments.

FIGS. 20–31 represent a third alternate configuration of the second embodiment of a spin pack assembly according to the present invention. This spin pack is designed to prepare 112 filament yarns having 14 filaments each of two colors, 28 filaments of a third color, and 56 filaments of a fourth color. Accordingly, the colored polymers are fed to the spin pack in proportion to their presence in the final product. FIGS. 20–29 show a spin pack for producing a product wherein the different colored fibers are grouped. The plate of FIG. 30 may be substituted for the plate of FIG. 27 to produce a product wherein the different colored fibers are distributed (ungrouped). The single plate of FIG. 31 may be substituted for the plate of FIG. 28 to produce an identical product (ungrouped) but with improved fluid dynamic properties.

Figure 20:
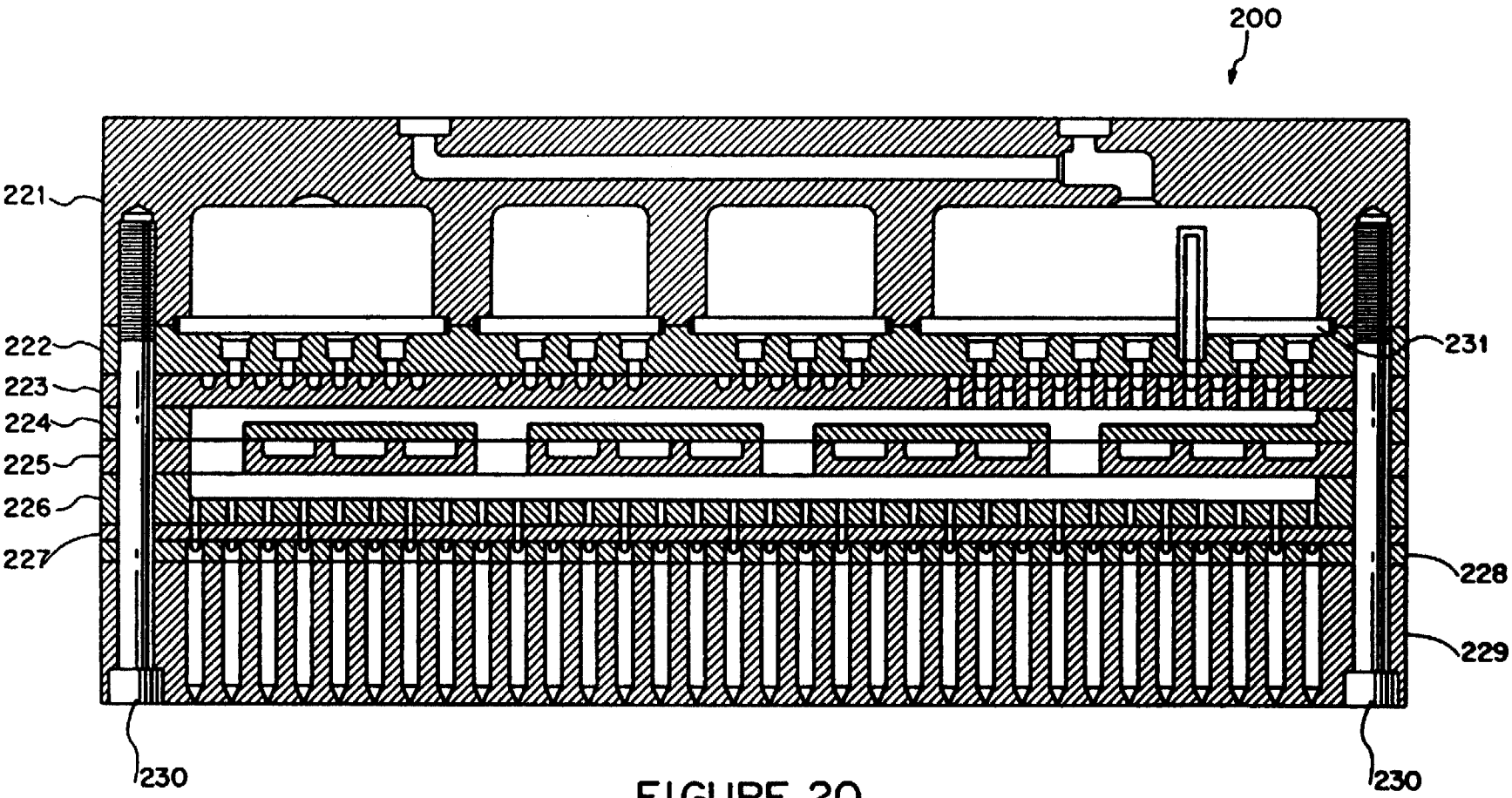
FIGS. 20–29 illustrate a third alternate configuration of the second embodiment of the spin pack of the present invention.

FIG. 20 is a cross-sectional elevational view of spin pack assembly 200. Spin pack assembly 200 includes spin pack housing 221, filter plate 222, first distribution plate 223, second distribution plate 224, third distribution plate 225, fourth distribution plate 226, program plate 227, metering plate 228, and spinneret 229. The assembly is held together with screws 230. Gasket 231 provides a seal between housing 221 and filter plate 222.

Figure 21:
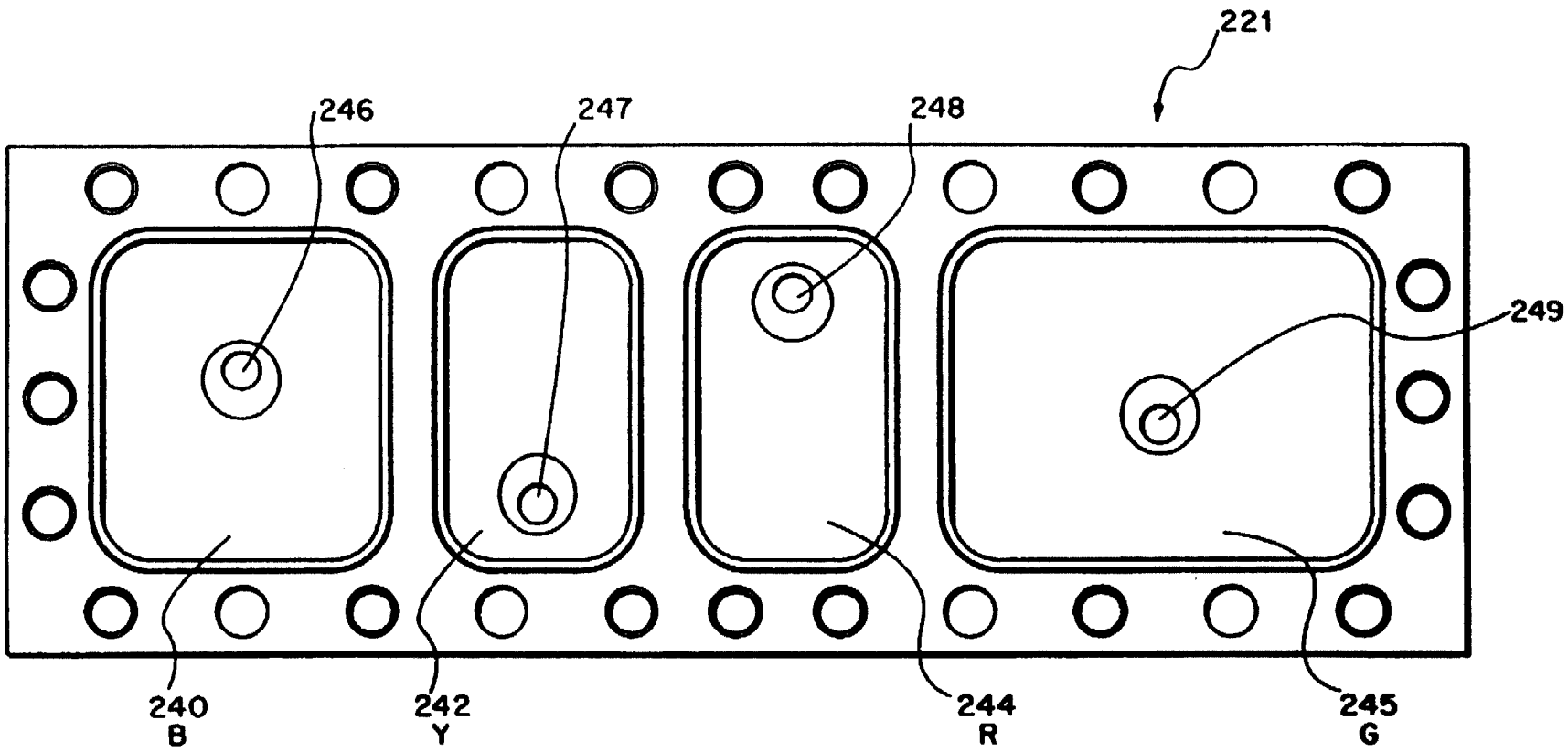

FIG. 21 is a bottom plan view of spin pack housing 221, showing polymer feed chambers 240, 242, 244, and 245, each with respective feed stream inlets 246, 247, 248, and 249 for respective polymer pools (B), (Y), (R), and (G).

Figure 22:
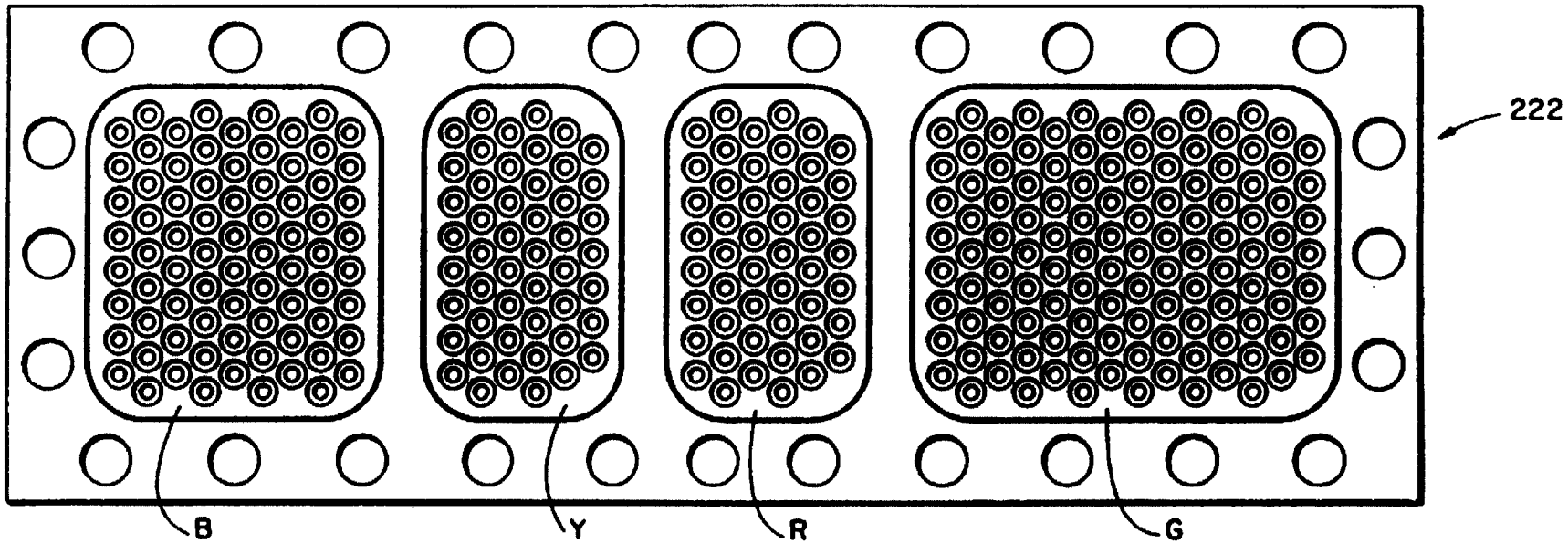

FIG. 22 is a top plan view of filter plate 222. The top face of filter plate 222 sealingly adjoins bottom face of spin pack housing 221 (FIG. 21). FIG. 22 shows the filtering orifices corresponding to each feed polymer pool of FIG. 21.

Figure 23:
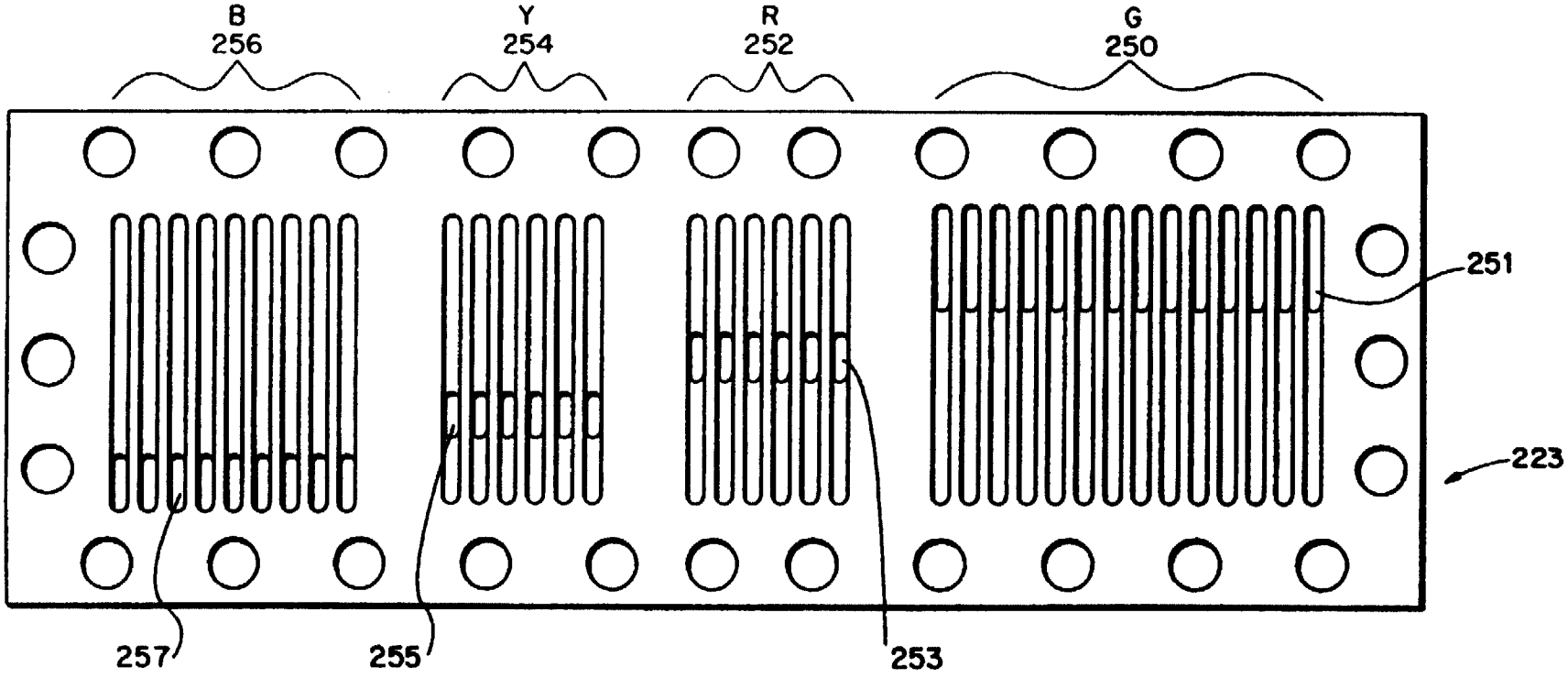

FIG. 23 is a top plan view of first distribution plate 223 showing vertical grooves 250. In each vertical groove 250, there is formed a through hole or slot 251. Vertical grooves 250 receive green polymer (G) from filtering orifices immediately above. Vertical grooves 252 receive red polymer (R) from filtering orifices immediately above. Vertical grooves 254 receive yellow polymer (Y) from filtering orifices immediately above. Vertical grooves 256 receive blue polymer (B) from filtering orifices immediately above. Each set of vertical grooves 250, 252, 254, and 256 are provided with through holes 251, 253, 255, and 257, respectively, which are aligned with horizontal channels (FIG. 24) and distribute polymer to plates below.

Figure 24:
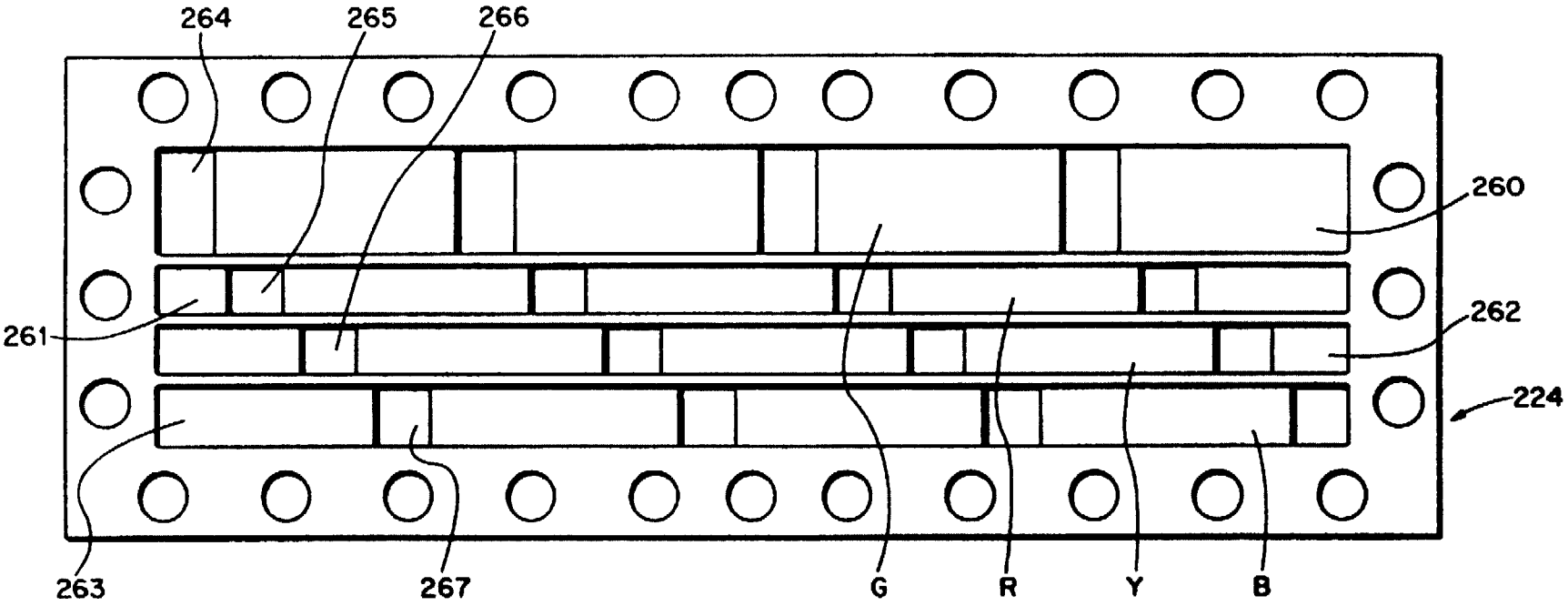

A top plan view of second distribution plate 224 is shown in FIG. 24. Here, horizontal channels receive polymer from first distribution plate 23 and, as shown, separate received flow into four smaller flows. Horizontal channel 260 receives green polymer from through holes 251. Horizontal channel 261 receives red polymer from through holes 253. Horizontal channel 262 receives yellow polymer from through holes 255. Horizontal channel 263 receives blue polymer from through holes 257. Four through holes are present in each channel to split the polymer feed into four individual streams. These streams are passed to the next distribution plate in a staggered fashion as is shown by the staggered arrangement of the through holes. Horizontal channel 260 is provided with through holes 264. Horizontal channel 261 is provided with through holes 265, which are horizontally offset to the right from through holes 264. Channel 262 is provided with through holes 266, which are offset to the right from through holes 265. Horizontal channel 263 is provided with through holes 267, which are offset to the right from through holes 266.

Figure 25:
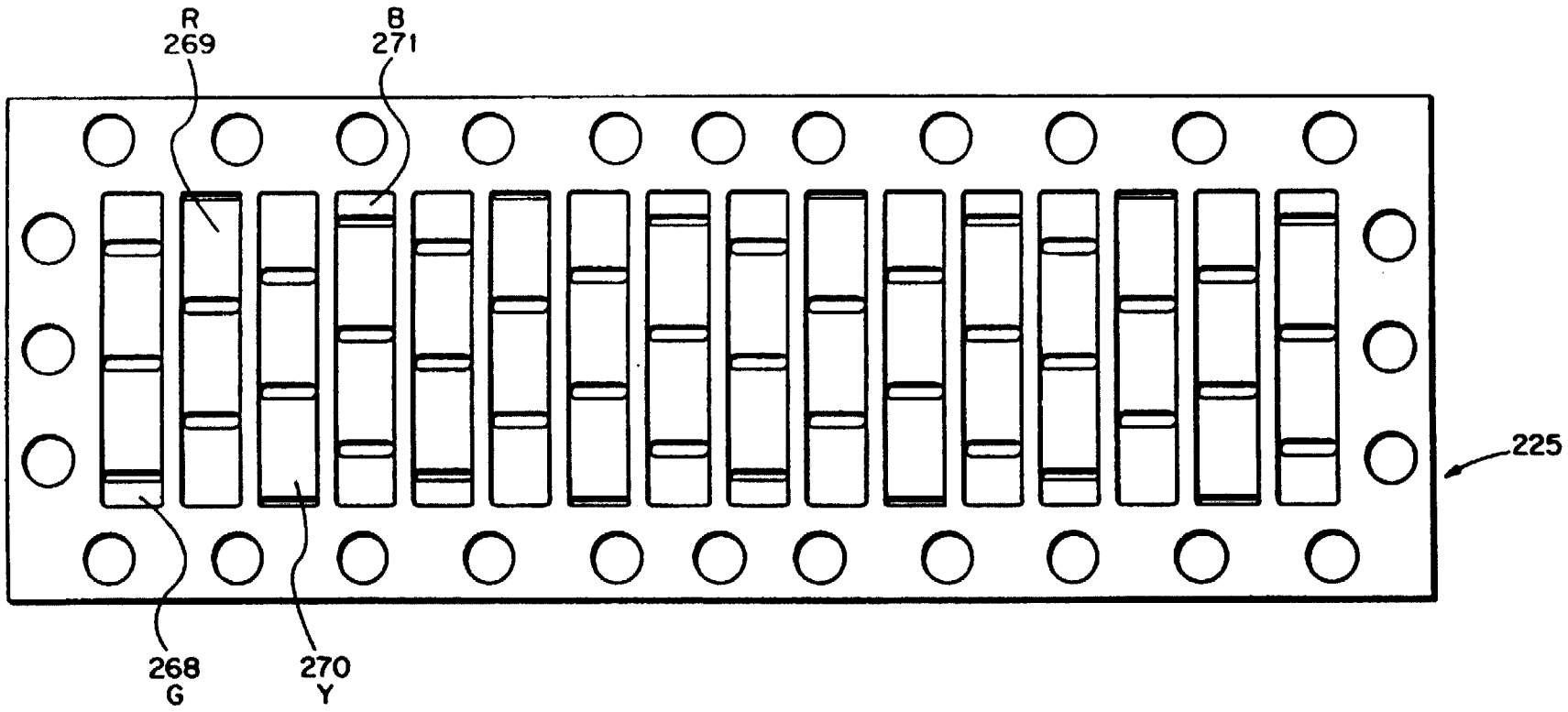

The purpose of the staggering or offsetting of the through holes in FIG. 24 is apparent from FIG. 25, which is a top plan view of third distribution plate 225. Third distribution plate 225 is provided with 16 vertical channels corresponding to the 16 through holes in second distribution plate 224. The vertical channels of distribution plate 225 alternatingly receive feed from distribution plate 224. Vertical channel 26 receives green polymer flow from through hole 264. Vertical channel 269 receives red polymer from through hole 265. Vertical channel 270 receives yellow polymer from through hole 266. Vertical hole 271 receives blue polymer from through hole 267. Each vertical channel is provided with three through holes to further split polymer flow.

Figure 26:
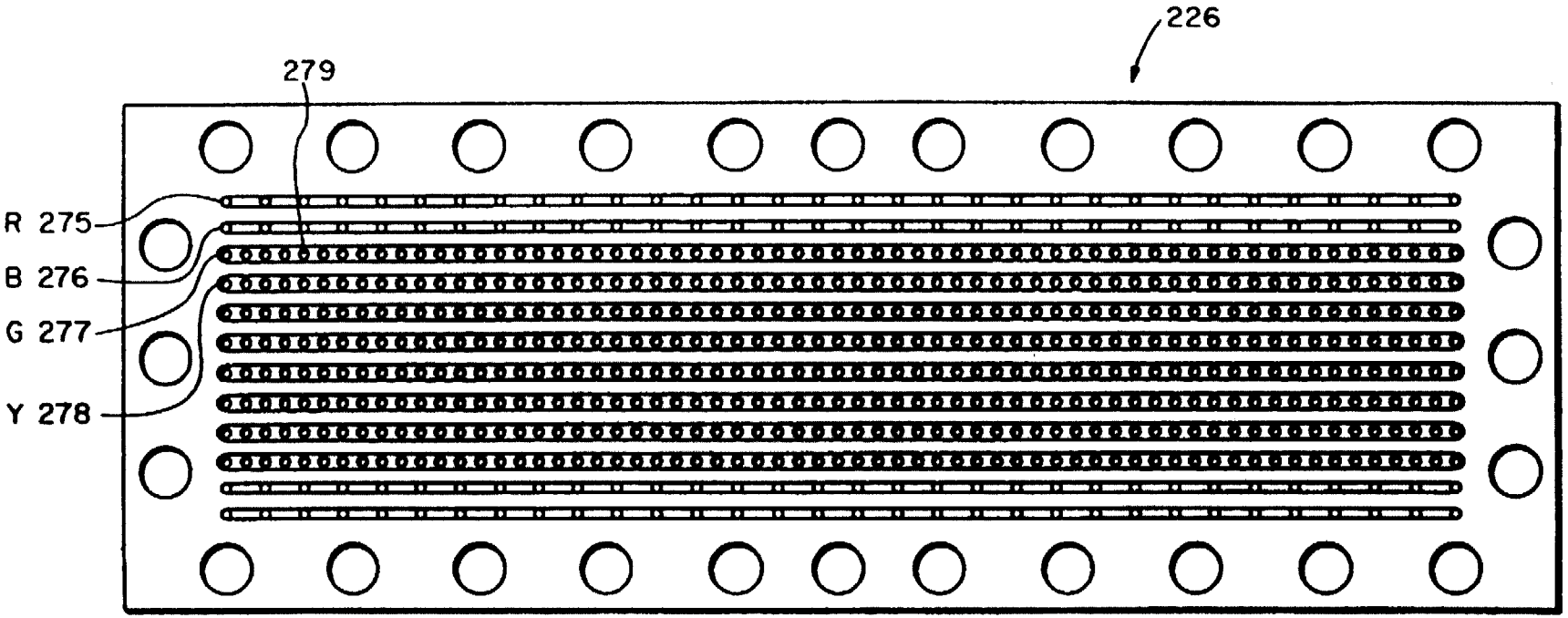

FIG. 26 shows the next plate, fourth distribution plate 226, in top plan view. Fourth distribution plate 226 is provided with horizontal grooves for receiving polymer flow from third distribution plate 225. As shown, horizontal groove 275 receives red polymer from vertical channel 226. Horizontal groove 276 receives blue polymer from vertical channel 271. Horizontal groove 277 receives green polymer from vertical channel 268, and horizontal groove 278 receives yellow polymer from vertical channel 270. Each horizontal groove is provided with through holes 279 for presenting numerous flow streams to the next plate.

Figure 27:
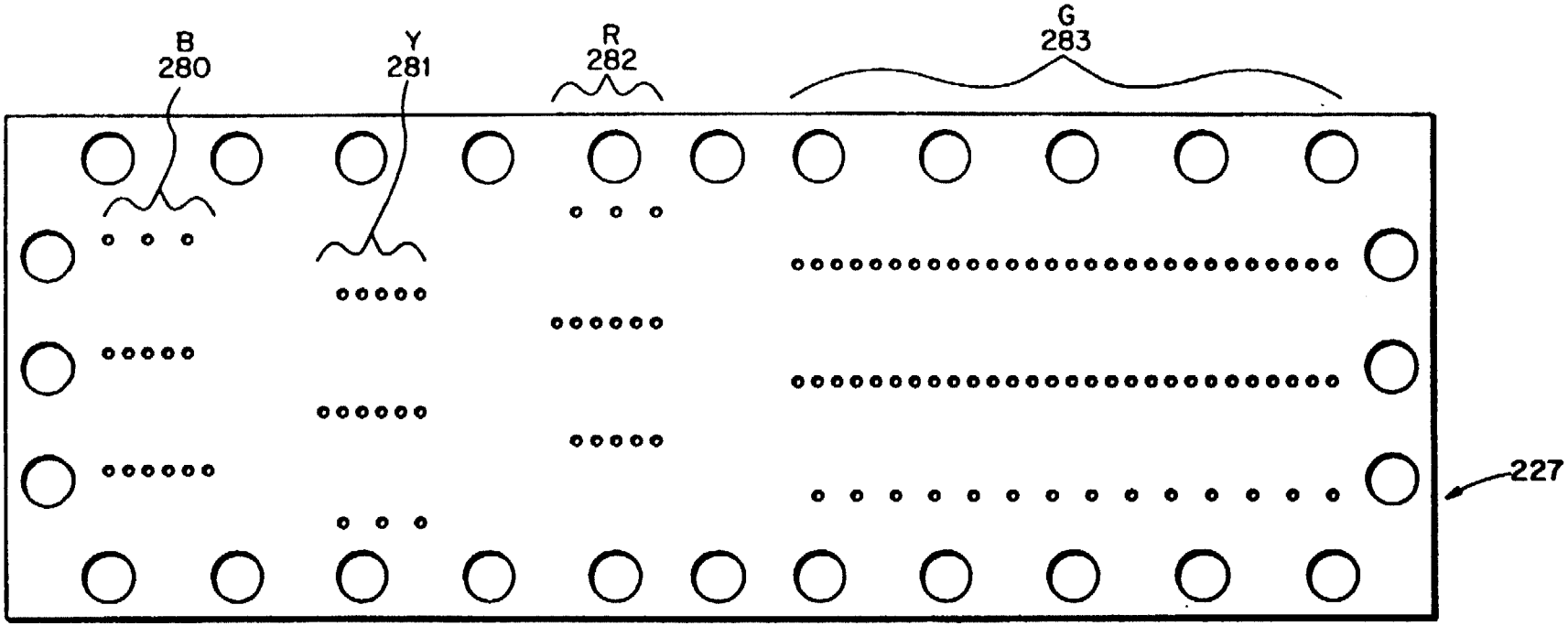
Figure 28:
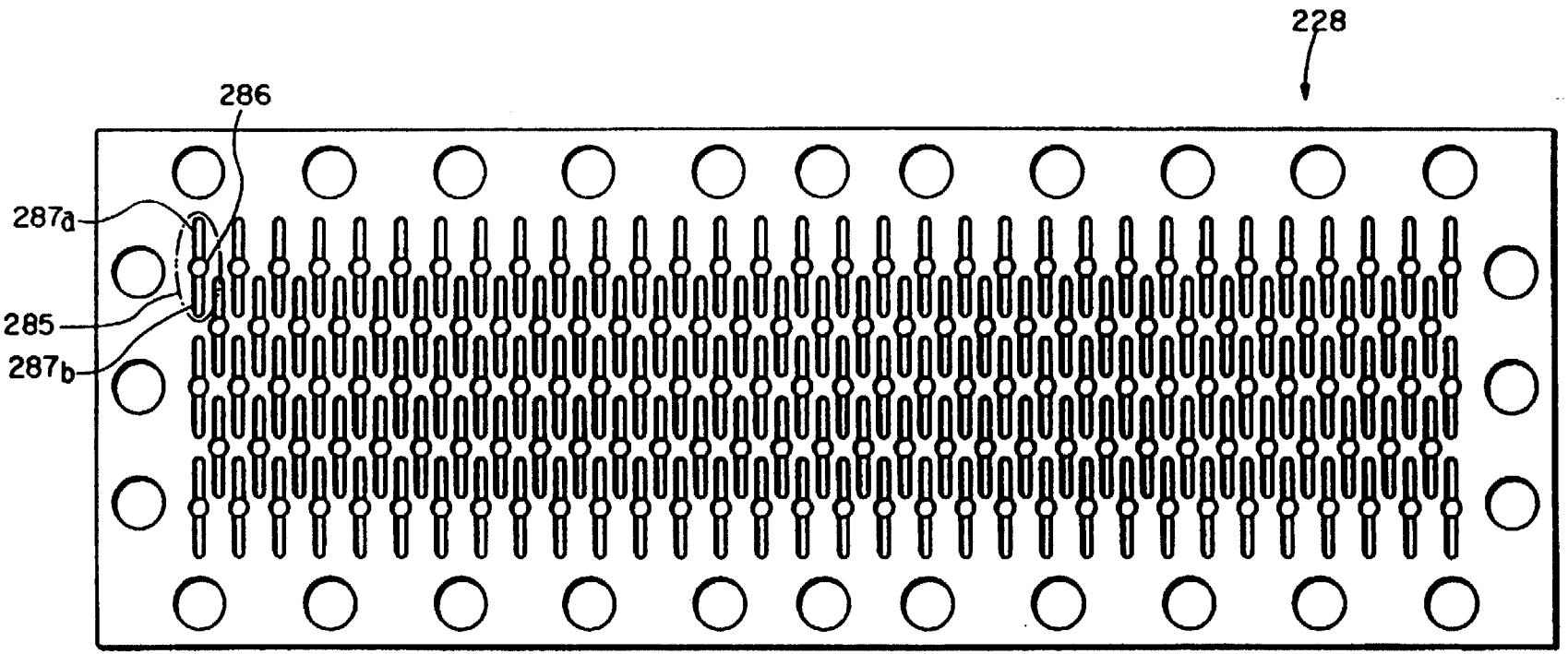

The next plate is program plate 227, shown in top plan view in FIG. 27. Program plate 227 selects the polymer colors which are passed through to metering plate 228 (FIG. 28). Program plate 227 is provided with through holes corresponding to the preselected polymer flow passing to the metering plate. As shown, program holes 280 permit blue polymer from horizontal grooves 276 to flow to the metering plate. Program holes 281 allow yellow polymer from horizontal groove 278 to flow to the metering plate. Program holes 282 allow red polymer from horizontal groove 275 to flow to the metering plate. Program holes 283 allow green polymer from horizontal groove 277 to flow to the metering plate. While distribution plate 226 makes each color of polymer available in the vicinity of the backhole of the spinneret (shown in FIG. 29), program plate 227 selects those streams which pass through to the metering plate, and thus, on to the backhole of the spinneret for extrusion into fiber. Various configurations of the program plate are conceivable. For example, if through holes were provided along the entire face of the program plate, and these holes corresponded to the horizontal rows of metering plate 226, then every polymer would be presented to every backhole.

This versatility is facilitated by metering plate 228 shown in top plan view in FIG. 28. Metering plate 228 is provided with one keyhole configuration 285 corresponding to each spinneret backhole or active extrusion orifice. Keyhole 285 is configured to receive flow from any one or up to all of the four separate polymer types. Each keyhole 285 includes metering hole 286 and wings 287a and 287b, which are elongated parts on either side of the keyhole. The wings are sufficiently long to align with all of the four polymer feeds presented by distribution plate 226 to program plate 227.

Figure 29:
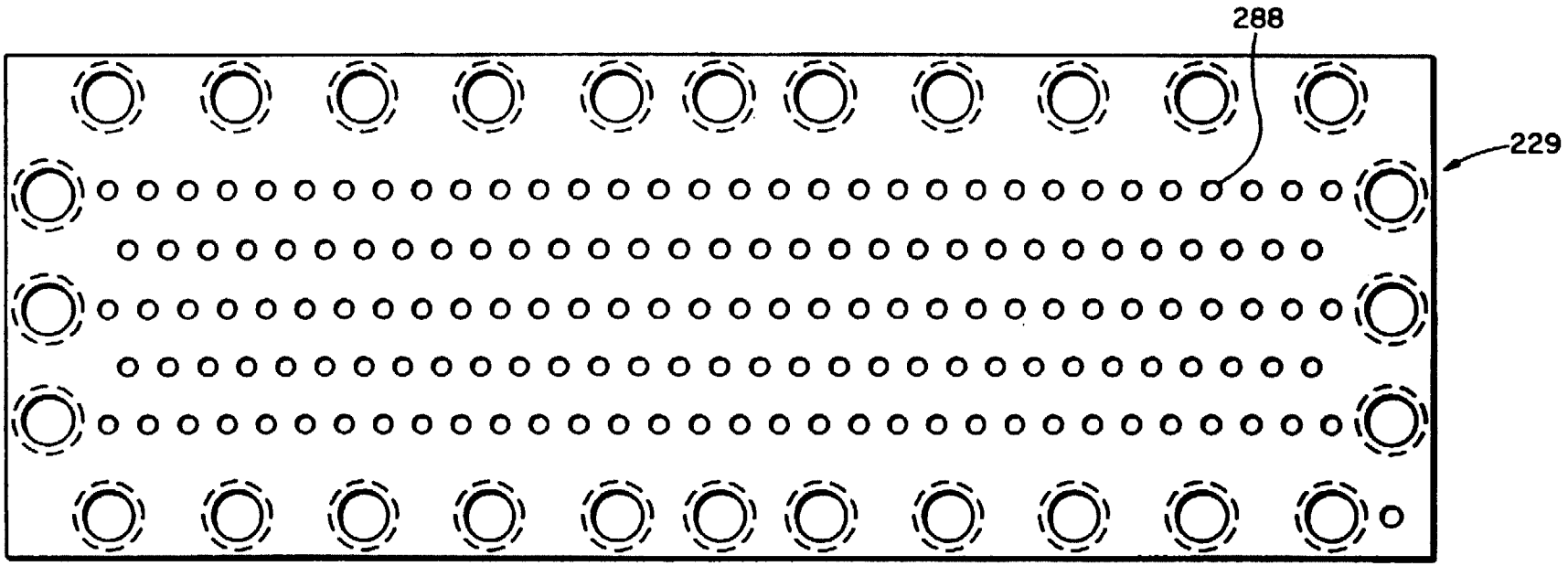

Turning to FIG. 29, there is shown in top plan view a spinneret which may be any known or developed spinneret, There is no known limit to the spinneret types useful in the present invention. Spinneret backholes 288 are shown.

Figure 30:
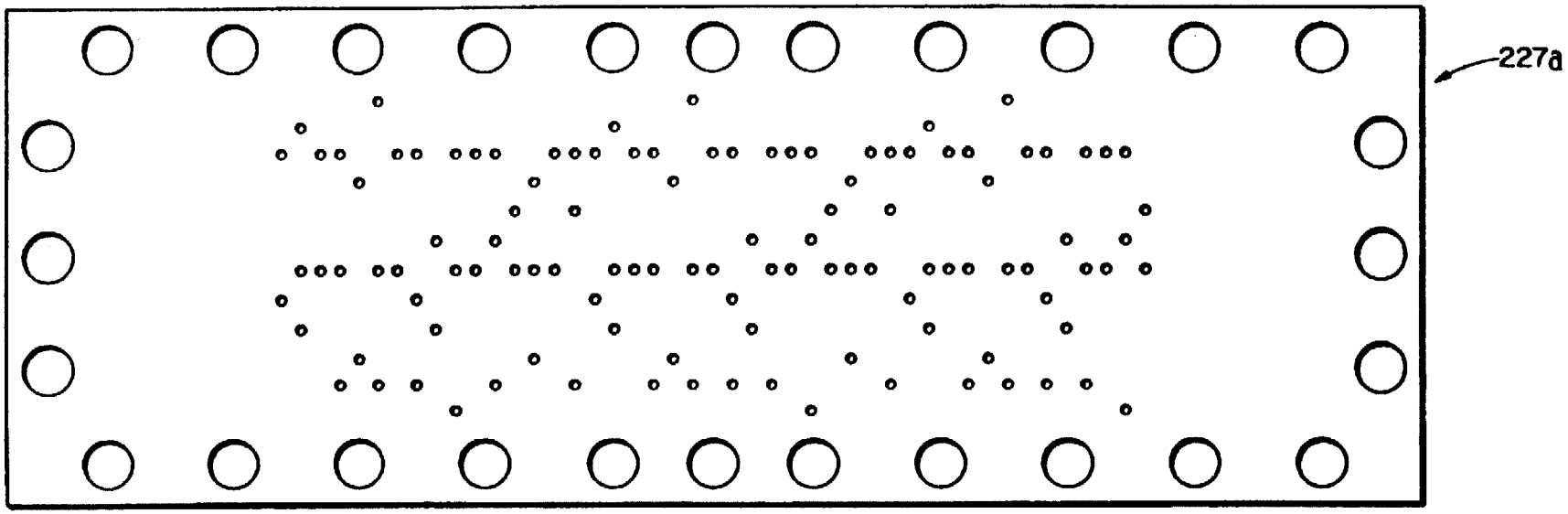
FIGS. 30–31 illustrates a fourth alternate configuration of the second embodiment of the spin pack of the present invention.
Figure 31:
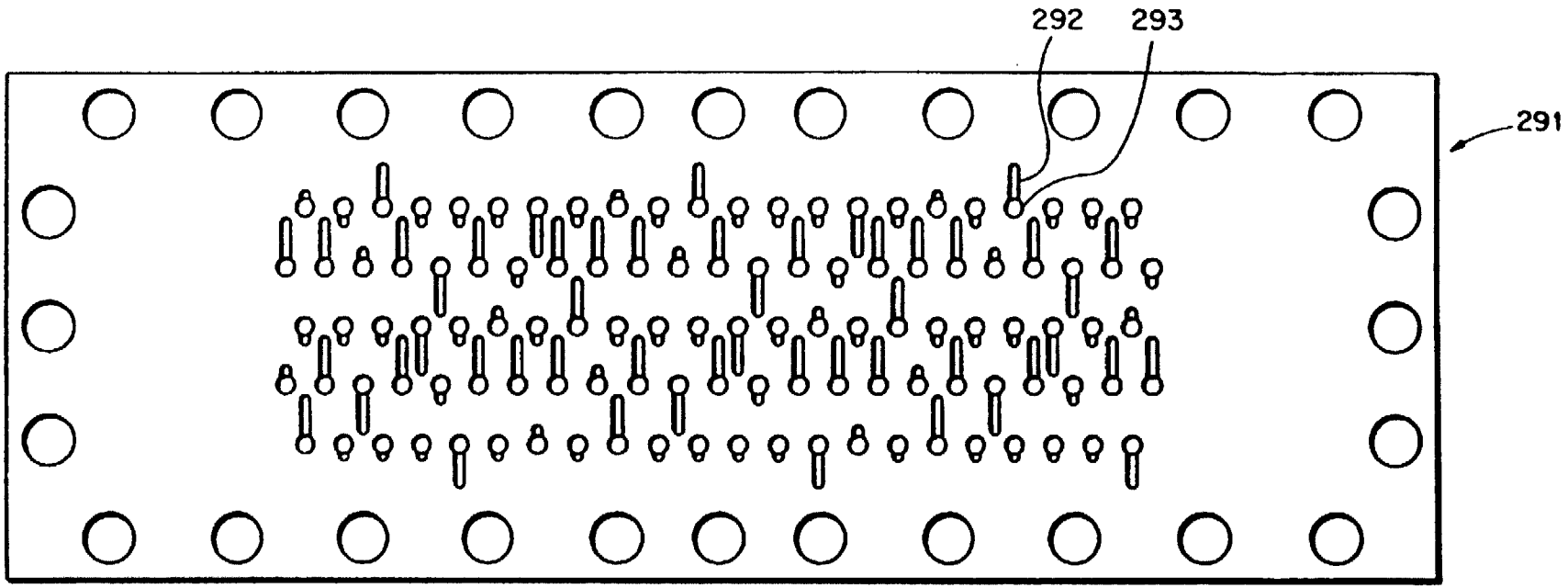

FIGS. 30 and 31 show alternative program and metering plates for use in the third alternate configuration of the second embodiment of the present invention, FIG. 30 is a top plan view of program plate 227a which may be substituted for program plate 227 to provide a more distributed (ungrouped) arrangement of the four polymer colors in the final yarn.

FIG. 31 is a top plan view of metering plate 291, which may be substituted for metering plate 228 (FIG. 28). Metering plate 291 is useful for products produced in high volume where versatility is not necessary. In addition, metering plate 291 has improved fluid dynamic characteristics. Each polymer color is accessible at the top surface of program plate 227a. Only certain colors pass through. The wings 292 on each metering hole 293 are just long enough to pick up the polymer fed through program plate 227a.

The present invention includes a process for spinning multiple components from a single spinneret. The process includes feeding mutually separated molten polymer components to a spin pack having a spinneret with extrusion orifices for extruding filaments. The typical extrusion orifices have a backhole for receiving molten polymer. Each mutually separated component is distributed so that each component is accessible as a distinct component at every spinneret backhole. Spin packs suitable for practicing the process of the present invention are described above.

[Another aspect of the present invention is a mixed filament yarn containing at least three different colored filaments, By using the process of the invention, the filaments can be arranged in the yarn with a uniformity never before possible, so that when made into carpet, the carpet gives a one-color appearance. This is accomplished by co-spinning the colors in a preselected uniform distribution across the spinneret face. The following example illustrates the uniqueness of the mixed filament yarn of the present invention. The example is presented for illustration purposes only, and is not intended to in any way limit the present invention.

EXAMPLE

Comparative Mixed Filament Yarns

Two different yarns of 112 filaments each are prepared. One yarn is prepared by spinning 28 blue, 42 gray, and 42 black filaments separately and then combining these yarns via a drawtexuring step to produce a heather yarn having a mottled or chunky appearance. The other yarn is prepared by spinning 28 red, 42 gray, and 42 black filaments and then combining them in the same manner.

Mixed Filament Yarns According to the Invention

A second set of two 112 filament yarns is prepared using a pack according to the design of the first configuration of the second embodiment of the present invention (FIGS. 10–16). The first yarn is made of 28 blue, 42 gray, and 42 black filaments. The second yarn is made of 28 red, 42 gray, and 42 black. The yarns from the spin pack of the present invention possess a high degree of filament mixing.

In all four cases, the yarns are prepared from BS700F polymer (available from BASF Corporation) in a melt spinning apparatus. The polymers are discharged at a temperature of 265° C. Finish oil is applied to the yarn and it is drawn to 3.1X. After texturizing, the yarn is wound onto a package at a speed in excess of 1500 mpm and a tension greater than 100 gms. The yarn has a denier of 2200.

Identical ends of the yarn are combined and then tufted into a 1/10 inch gauge level loop carpet having a face fiber weight of between 24 and 30 ounces per square yard. The four samples produced are judged for solid color appearance by a panel of observers using a paired comparison method. The results are given in Table 1. A higher number on a scale of 0 to 5 indicates a greater degree of filament mixing.

TABLE 1

| SUBJECTIVE APPEARANCE RATINGS FILAMENT MIXING | | | |
|---|---|---|---|
| Conventional Yarns | (Blue, White, Black) | Carpet 1 | 1.0 |

TABLE 1-continued

| SUBJECTIVE APPEARANCE RATINGS FILAMENT MIXING | | | |
|---|---|---|---|
| | (Red, White, Black) | Carpet 2 | 0.8 |
| Yarns of the Invention | (Blue, White, Black) | Carpet 1 | 4.6 |
| | (Red, White, Black) | Carpet 2 | 3.7 |

A still further aspect of the present invention is a yarn in which there is a high degree of filament mixing in one zone of the yarn and one or more zones of no mixing. For example, a yarn is composed of three components which are highly mixed in one zone of the yarn and the remainder of the yarn is composed of a concentration of a single component. It is contemplated that there are two or more such zones of component concentration.]

What is claimed is:

1. A process for spinning mixed filament yarn comprising:

(a) feeding three or more differentially colored mutually separated molten polymer components to spin pack having a spinneret with extrusion orifices for issuing filaments, each extrusion orifice having a backhole for receiving molten polymer;

(b) distributing each mutually separated component so that every component is accessible as a distinct component at every active spinneret backhole;

(c) selectively preventing, via a plate having through holes, all but one component from entering a backhole; and (d) extruding [multiple component] *mixed filament* yarn.

2. The process of claim 1 wherein said distributing comprises b.1) pooling each component; b.2) after said pooling, splitting the pool into multiple distinct streams; and b.3) routing the multiple distinct streams to the vicinity of each spinneret backhole.

3. The process of claim 1 wherein said distributing comprises:

b.1) routing each mutually separated component to a series of distribution plates having grooves with through holes therein;

b.2) splitting the streams in each groove; and b.3) passing the split streams to the vicinity of each spinneret backhole.

* * * * *